United States Patent Office 3,014,037
Patented Dec. 19, 1961

3,014,037
N-ALKOXYPHENALKYL-α,α-DIPHENYL-4-PIPERI-
DINEMETHANOLS AND PROCESSES
Kurt J. Rorig, Glenview, Ill., assignor to G. D. Searle &
Co., Chicago, Ill., a corporation of Delaware
No Drawing. Filed Sept. 12, 1957, Ser. No. 683,445
4 Claims. (Cl. 260—294.7)

This invention relates to N-alkoxyphenalkyl-α,α-diphenyl-4-piperidine(methanes and methanols) and processes for the manufacture thereof. More particularly, this invention relates to compounds of the formula

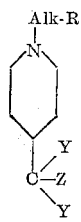

wherein R represents an alkoxyphenyl radical, Alk represents an alkylene radical, Z represents hydrogen or a hydroxy radical, and Y represents a phenyl radical.

Among the alkoxyphenyl radicals comprehended by R in the foregoing formula, those wherein one or more lower alkoxy groupings appear are preferred. Examples of the lower alkoxy groupings desirably present are methoxy, ethoxy, propoxy, isopropoxy, and homologous straight- and branched-chain $C_nH_{2n+1}O$ radicals wherein $n$ is a positive integer amounting to less than nine. As to the alkylene radicals contemplated by Alk, these likewise comprise one or a plurality of carbon atoms, said carbon atoms being arranged in chains, either straight or branched, and comprising, together with appropriate hydrogen, bivalent saturated acyclic groupings of the type: methylene, ethylene, trimethylene, 1,2-propylene, tetramethylene, 2,2-dimethyl-1,3-propylene, and the like.

Equivalent to the basic amines of this invention for the purposes here described are non-toxic acid addition and quaternary ammonium salts thereof, the compositions of which may be symbolized by

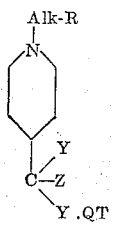

wherein R, Alk, Z, and Y have the meanings hereinbefore assigned; Q is selected from among hydrogen and lower alkyl, hydroxy (lower alkyl), and lower alkenyl radicals, as also such aralkyl radicals as benzyl, phenethyl, and naphthylmethyl; and T is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds of this invention are useful because of their valuable pharmacological properties. Especially, the subject compositions are anti-spasmodic and anti-secretory agents. The compounds defined by the claims, for example, are characterized by an extraordinary capacity for musculotropic spasmolysis wholly unforeshadowed by the prior art. Thus, N-(p-methoxybenzyl)-α,α-diphenyl-4-piperidinemethanol (as the hydrochloride), in the well-known Magnus test for relaxation of barium-induced smooth muscle spasm, produced 316±46 times the effect of papaverine hydrochloride (a widely-recognized standard of spasmolytic potency), whereas the hitherto unreported corresponding non-alkoxylated material, N-benzyl-α,α-diphenyl-4-piperidinemethanol (as the hydrobromide), manifests merely ⅙ to ½ this degree of activity, and the closest product of the prior art, α,α-diphenyl-4-piperidinemethanol (as the acetate—more soluble than the hydrohalide), is ¼ as active as the papaverine standard and less than 0.1% as potent as the representative alkoxybenzyl compound supra.

The claimed compositions are manufactured by condensation of α,α-diphenyl-4-piperidinemethanol with an appropriate N-alkoxyphenalkyl halide R-Alk-X under the influence of an anhydrous alkaline catalyst in the presence of oxygenated solvent, R and Alk in the formula for the halide being defined as above and X representing chlorine or bromine.

Alternatively, α,α-diphenyl-4-pyridinemethanol can be condensed with the aforesaid N-alkoxyphenalkyl halide of choice (usually in a halogenated solvent, such as chloroform) and, subject to a tendency to hydrogenolysis of the carbon-nitrogen linkage thus formed, the resultant quaternary ammonium compound

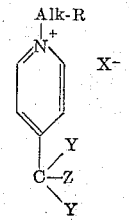

reduced with platinum catalyst in alcoholic medium to give the desired piperidine, X, Y and Z in the formula being defined as before.

Conversion of the amine bases of this invention to corresponding acid addition salts is accomplished by simple admixture of these compounds with one equivalent of any of various inorganic and strong organic acids, the anionic portion of which conforms to T as hereinabove defined.

The quaternary ammonium compounds comprehended by this invention are those derived by contacting a claimed base with an organic ester of the formula

Q—T

Q and T being limited by the meanings hereinbefore assigned. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately one hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of material in parts by weight, except as otherwise noted.

EXAMPLE 1

N - (p - methoxybenzyl) - α,α - diphenyl - 4 - piperidinemethanol hydrochloride

A mixture of 27 parts of α,α-diphenyl-4-piperidinemethanol, 17 parts of p-methoxybenzyl chloride, 10 parts of powdered anhydrous potassium carbonate, and 160 parts of butanone is heated at the boiling point under reflux for 27 hours, whereupon solvent is evaporated and the residual oil partitioned between chloroform and water. The chloroform phase is separated, thoroughly washed with excess dilute aqueous muriatic acid, dried over anhydrous sodium sulfate, and evaporated to a crystalline "mush" which, upon trituration with ether and evaporation thereof, is converted to a white powder. The powder is recrystallized from anhydrous ethanol as a dense white material melting at approximately 225–226° C. This material is N-(p-methoxybenzyl)-α,α-diphenyl-4-piperidinemethanol hydrochloride, of the formula

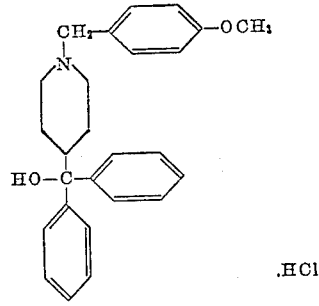

Alkalization of an aqueous solution of the foregoing hydrochloride precipitates the corresponding base in purified form. Isolation thereof is effected by extraction into chloroform and subsequent evaporation of solvent under reduced pressure.

EXAMPLE 2

N - (3,4 - dimethoxyphenethyl) - α,α - diphenyl - 4-piperidinemethanol hydrochloride Using the technique of the preceding Example 1, but substituting 37 parts of 3,4-dimethoxyphenethyl bromide for the 17 parts of p-methoxybenzyl chloride therein and maintaining the reactants at the boiling point for 36 rather than 27 hours, there is obtained N-(3,4-dimethoxyphenethyl) - α,α - diphenyl - 4 - piperidinemethanol hydrochloride of the formula

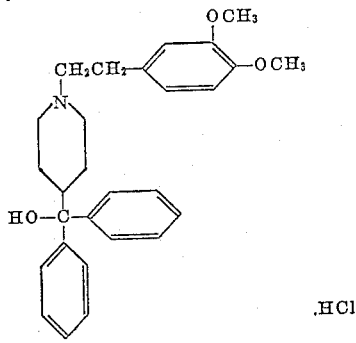

EXAMPLE 3

N - (3,4,5 - trimethoxybenzyl) - α,α - diphenyl - 4 - piperidinemethanol hydrochloride A mixture of 27 parts of α,α-diphenyl-4-piperidinemethanol, 22 parts of 3,4,5-trimethoxybenzyl chloride, 10 parts of powdered anhydrous potassium carbonate, and 160 parts of butanone is heated at the boiling point under reflux for 24 hours, then worked up in accordance with the procedure of Example 1 to give N-(3,4,5-trimethoxybenzyl) - α,α - diphenyl - 4 - piperidinemethanol hydrochloride, of the formula

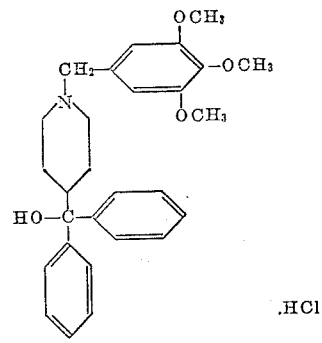

What is claimed is:
1. A compound of the formula

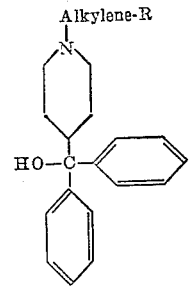

wherein the alkylene radical represented contains fewer than 3 carbon atoms and R represents an alkoxyphenyl radical of the formula

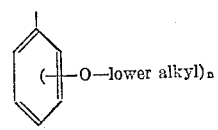

in which $n$ represents a positive integer less than 4.
2. N - (p - methoxybenzyl) - α,α - diphenyl - 4 - piperidinemethanol.
3. N - (3,4 - dimethoxyphenethyl) - α,α - diphenyl-4-piperidinemethanol.
4. N - (3,4,5 - trimethoxybenzyl) - α,α - diphenyl-4-piperidinemethanol.

References Cited in the file of this patent

UNITED STATES PATENTS 2,832,785　Biel ＿＿＿＿＿＿＿＿＿＿＿＿ Apr. 29, 1958

FOREIGN PATENTS 740,740　Great Britain ＿＿＿＿＿＿＿＿＿＿ Nov. 16, 1955
529,738　Canada ＿＿＿＿＿＿＿＿＿＿＿＿＿ Aug. 28, 1956